(12) United States Patent
Ogata et al.

(10) Patent No.: US 6,278,576 B1
(45) Date of Patent: *Aug. 21, 2001

(54) MAGNETIC HEAD WITH MAGNETIC METAL FILM CORE HAVING OFFSET HALVES

(75) Inventors: Seiichi Ogata; Tadashi Saito; Teruo Inaguma; Shinji Takahashi; Yoshihiko Inoue, all of Miyagi (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/006,460

(22) Filed: Jan. 13, 1998

(30) Foreign Application Priority Data

Jan. 14, 1997 (JP) .................................................. 9-004753
Feb. 25, 1997 (JP) .................................................. 9-040906
Jun. 30, 1997 (JP) .................................................. 9-173352

(51) Int. Cl.$^7$ .................................................. G11B 5/147
(52) U.S. Cl. .................................................. 360/119
(58) Field of Search .................................................. 360/125, 119, 360/122, 126

(56) References Cited

U.S. PATENT DOCUMENTS

| 5,157,569 | * | 10/1992 | Kumasaka et al. | 360/126 |
| 5,276,575 | * | 1/1994 | Kobayashi et al. | 360/126 |
| 5,519,556 | * | 5/1996 | Saito et al. | 360/125 |
| 5,654,844 | * | 8/1997 | Ohmori et al. | 360/84 |
| 5,691,866 | * | 11/1997 | Yamamoto | 360/126 |

FOREIGN PATENT DOCUMENTS 62-157306 * 7/1987 (JP) .

* cited by examiner

Primary Examiner—David Davis
(74) Attorney, Agent, or Firm—Sonnenschein Nath & Rosenthal

(57) ABSTRACT

A magnetic head having optimum recording/reproducing characteristics and a method for producing the magnetic head. A pair of magnetic core halves 2, 3, each having a substrate 4 and a thin magnetic metal film 6 formed obliquely on it, are bonded together via a non-magnetic material C for defining a magnetic gap. A portion of the substrate faces a junction surface 8 of the magnetic core halves 2, 3. The substrate portion is arranged for facing an end face of the magnetic meta film 6 of the opposite side magnetic core half facing the junction surface 8.

7 Claims, 13 Drawing Sheets

MAGNETIC HEAD WITH MAGNETIC METAL FILM CORE HAVING OFFSET HALVES

BACKGROUND OF THE INVENTION

1. Field of the invention

This invention relates to a magnetic head having a magnetic path formed by a magnetic metal film, and a manufacturing method therefor.

2. Description of Related Art

In a magnetic recording/reproducing apparatus, such as a video tape recorder, researches in digitizing signals and recording the resulting digitized signals for improving the picture quality, are under way. In keeping pace therewith, researches in increasing the recording density and the recording frequency, are also progressing.

Meanwhile, with the increased magnetic recording density and increased recording frequency, a magnetic head loaded on the magnetic recording/reproducing apparatus is required to have a high output and a low noise in the high frequency range. For example, in a compound metal-in-gap magnetic head used frequently as a magnetic head for VTR, in which a magnetic metal film is formed on a ferrite material and a coil is placed thereon, has a large inductance and a low output per inductance, as a result of which the output is low in the high frequency range. Thus, it is difficult to cope sufficiently with digital picture recording for which a high frequency and a high density are required.

Under these circumstances, a so-called thin film type magnetic head, fabricated by the thin film forming step, is being investigated as a magnetic head for coping with the high frequency.

This thin film type magnetic head is formed by connecting a pair of magnetic head halves having magnetic metal films via a gap material in-between. In the magnetic head halves is embedded a magnetic metal film having its connecting surface formed by a non-magnetic material, such as glass, and substantially rectangular-shaped coil-forming recesses are formed at mid portions thereof. In the coil-forming recesses of the magnetic head halves is placed a coil formed by a thin film forming technique, such as photolithography. These magnetic head halves are joined together via a non-magnetic gap material in-between for forming the magnetic gap between the magnetic metal films.

With the above-described thin-film type magnetic head, it has been difficult to form the magnetic metal films in position for facing each other on a sole substrate. That is, in the above-described magnetic head, one of the thin magnetic metal films becomes offset relative to the other film, as shown in FIG. 1. The magnetic head shown in FIG. 1 undergoes so-called track offset, with an offset angle being θ. In the present magnetic head, an azimuth angle is represented by α.

In the above-described magnetic head, an angle defined between the counter-azimuth direction shown by arrow R in FIG. 1 and the bisector of the angle of track offset shown at Q in FIG. 1 becomes small. The result is that, in the conventional magnetic head, neighboring recording tracks are reproduced, thus producing the noise. That is, this magnetic head suffers from high playback fringing.

With the present magnetic head, it may be premeditated that, as shown in FIG. 2, one of the thin magnetic metal films 100 be relatively offset to the other metal film in an opposite direction to that shown in FIG. 1. With this magnetic head, the anglex between the opposite azimuth direction R and the bisector Q of the angle of track offset in this case becomes larger thus suppressing the playback fringing to a smaller value. However, in the magnetic head shown in FIG. 2, the track offset angle θ is of a smaller value.

In a magnetic head, the larger the angle of track offset θ, the smaller is the recording fringing value. That is, in the present magnetic head, if the track offset angle θ is small, signals are recorded on the neighboring recording track, thus partially erasing the signals of the neighboring track. Thus, if the thin magnetic metal films 100 are relatively offset, as shown in FIG. 25, the recording fringing is of a higher value, because the track offset angle θ is small.

The above-mentioned defects in the recording/reproducing characteristics due to relative position offset of the magnetic thin film 100 can be evaded by setting the magnetic thin metal films in position relative to each other. That is, in the conventional magnetic head, the track offset angle θ can be set so as to be as large as 90° or more by bonding the paired magnetic metal films in position for facing each other. This renders it possible to suppress the recording fringing and the reproducing fringing to a lower value thus achieving optimum recording/reproducing characteristics.

However, it is extremely difficult to bond the paired magnetic metal films in position for facing each other. For correctly positioning the paired thin magnetic metal films in position, the manufacturing device needs to be improved in accuracy significantly, which is not a realistic method for solution. It may also be premeditated to remove track offset by laser trimming after bonding the paired magnetic thin metal films. In this case, laser trimming is applied to each magnetic head in the manufacturing process of simultaneously fabricating plural magnetic heads, thus not only complicating the manufacturing process but also requiring excess working time.

SUMMARY OF THE INVENTION

It is therefore an object of the present invention to overcome the above-mentioned problems in the conventional magnetic head and to provide a magnetic head having optimum recording/reproducing characteristics.

It is another object of the present invention to overcome the above-mentioned problems in the conventional magnetic head and to provide a magnetic head having optimum recording/reproducing characteristics.

In one aspect, the present invention provides a magnetic head in which a pair of magnetic core halves, each having a substrate and a magnetic metal film formed obliquely thereon, are bonded together via a non-magnetic material for defining a magnetic gap, wherein a portion of the substrate faces the junction surface of the magnetic core halves. This substrate portion is arranged for facing an end face of the magnetic meta film of the opposite side magnetic core half facing the junction surface.

With the present magnetic head, the track offset angle becomes larger at all times even if the magnetic core halves are bonded together without correctly positioning the thin magnetic metal films formed on the respective substrates. That is, with the present magnetic head, since the magnetic core halves are bonded together so that the thin magnetic metal film on one of the substrates faces the opposite side substrate, the track offset angle becomes larger even if magnetic core halves are bonded together without correctly positioning the thin magnetic metal films. Thus, the present magnetic head is reduced in recording fringing thus exhibiting optimum recording characteristics.

Moreover, with the present magnetic head, since the thin magnetic metal film on one of the substrates faces the opposite side substrate, the angle between the counter-azimuth direction and the bisector of the track offset angle can be increased, so that the playback fringing is reduced to assure optimum reproducing characteristics.

With the present magnetic head, thin magnetic metal film may have a portion in the vicinity of the junction surface cut out so that the film is progressively reduced in thickness towards the junction surface.

With the present magnetic head, the magnetic flux density is concentrated towards the magnetic gap, so that the magnetic head has an improved output during recording/reproduction.

In another aspect, the present invention provides a method for producing a magnetic head in which a pair of magnetic core halves, each having a substrate and a thin magnetic metal film formed obliquely thereon, are bonded together via a non-magnetic material for defining a magnetic gap. the method includes the steps of obliquely forming a thin magnetic metal film on the substrate and subsequently grinding the junction surface for exposing the substrate on the junction surface, and bonding the magnetic core halves so that a portion of one of the substrates facing the junction surface faces the end face of the thin magnetic metal film of the other magnetic core half facing the junction surface.

With the present manufacturing method for manufacturing the magnetic head, the magnetic core halves are bonded together so that a portion of the substrate is exposed to the junction surface and the exposed portion of the substrate faces the thin magnetic metal film on the opposite side substrate. Thus, with the present technique, the track offset angle can be increased even if the paired thin magnetic metal films are not positioned correctly. Moreover, if the paired thin magnetic metal films are bonded together by this technique, the angle between the counter-azimuth direction and the bisector of the track offset angle can be increased, so that the playback fringing is reduced to assure optimum recording/reproducing characteristics.

With the present method, the thin magnetic metal film may have a portion in the vicinity of the junction surface cut out so that the film is progressively reduced in thickness towards the junction surface.

With the present method, the magnetic flux density is concentrated towards the magnetic gap, so that the magnetic head may be manufactured which has an improved output during recording/reproduction.

With the magnetic head and the manufacturing method according to the present invention, the substrate is exposed on a portion of the thin magnetic metal film on the junction surface defining the magnetic gap and the substrate thus exposed on the junction surface faces the magnetic metal film of the opposite side substrate. Thus, the track offset angle can be increased, while the angle between the counter-azimuth direction and the bisector of the track offset angle can be increased, thus suppressing recording fringing and playback fringing for assuring optimum recording/reproducing characteristics.

DESCRIPTION OF PREFERRED EMBODIMENTS

Figure 1:
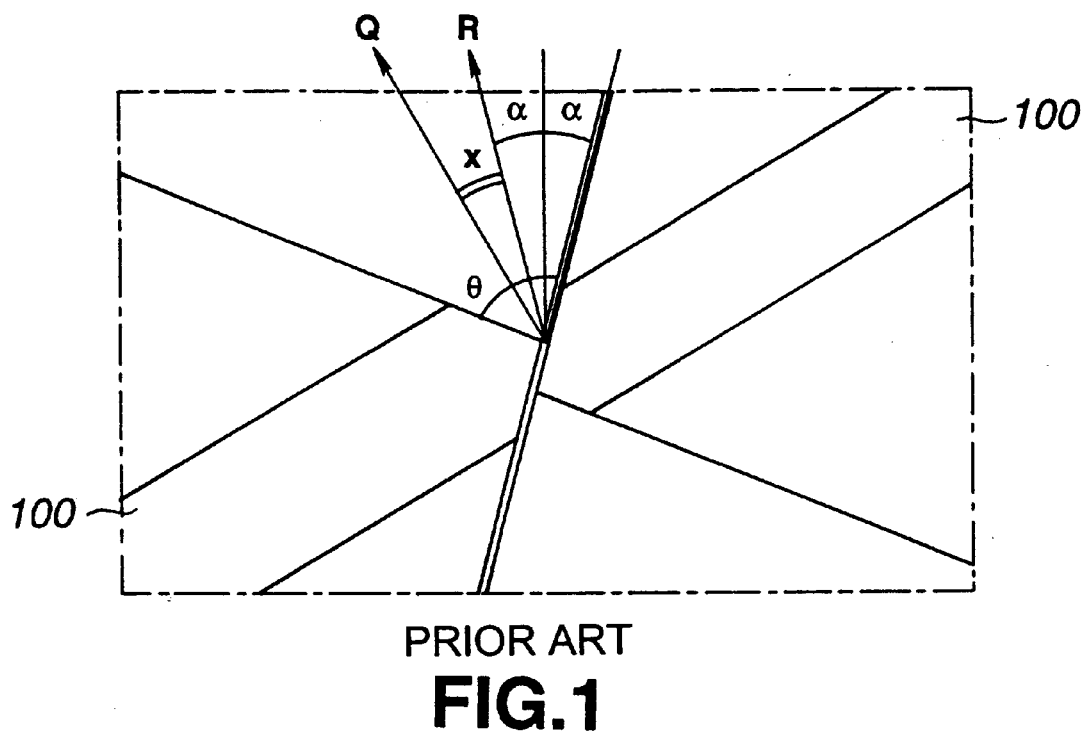
FIG. 1 is a plan view showing a conventional magnetic head.
Figure 2:
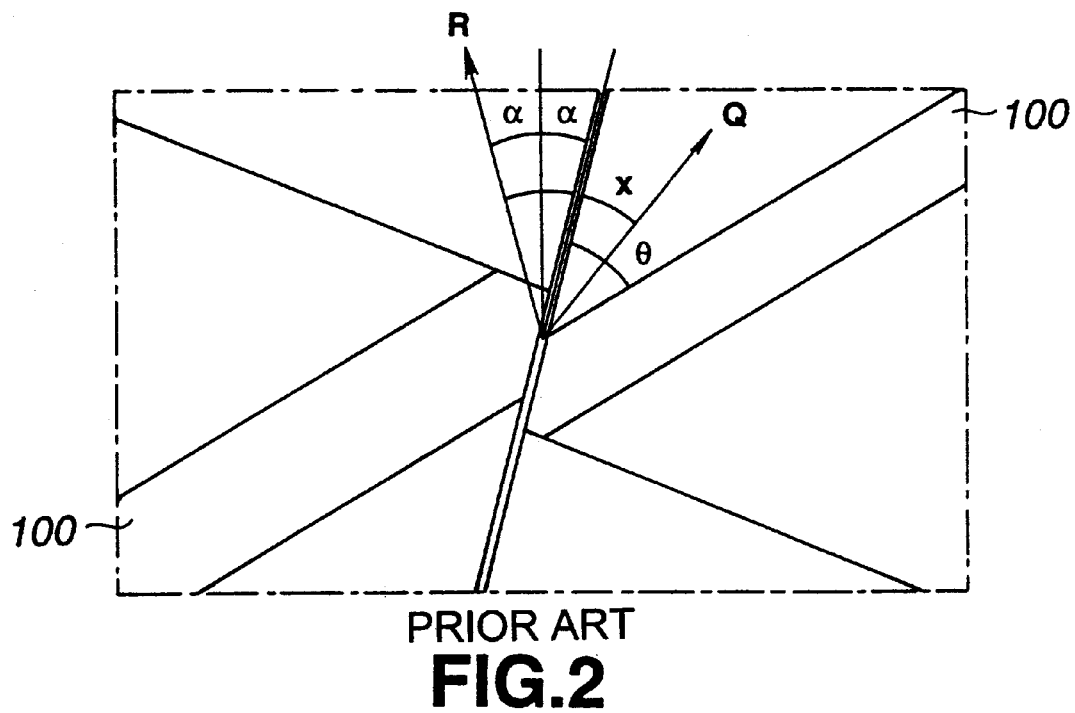
FIG. 2 is a plan view showing another conventional magnetic head.

Referring to the drawings, preferred embodiments of a magnetic head according to the present invention will be explained in detail.

Figure 3:
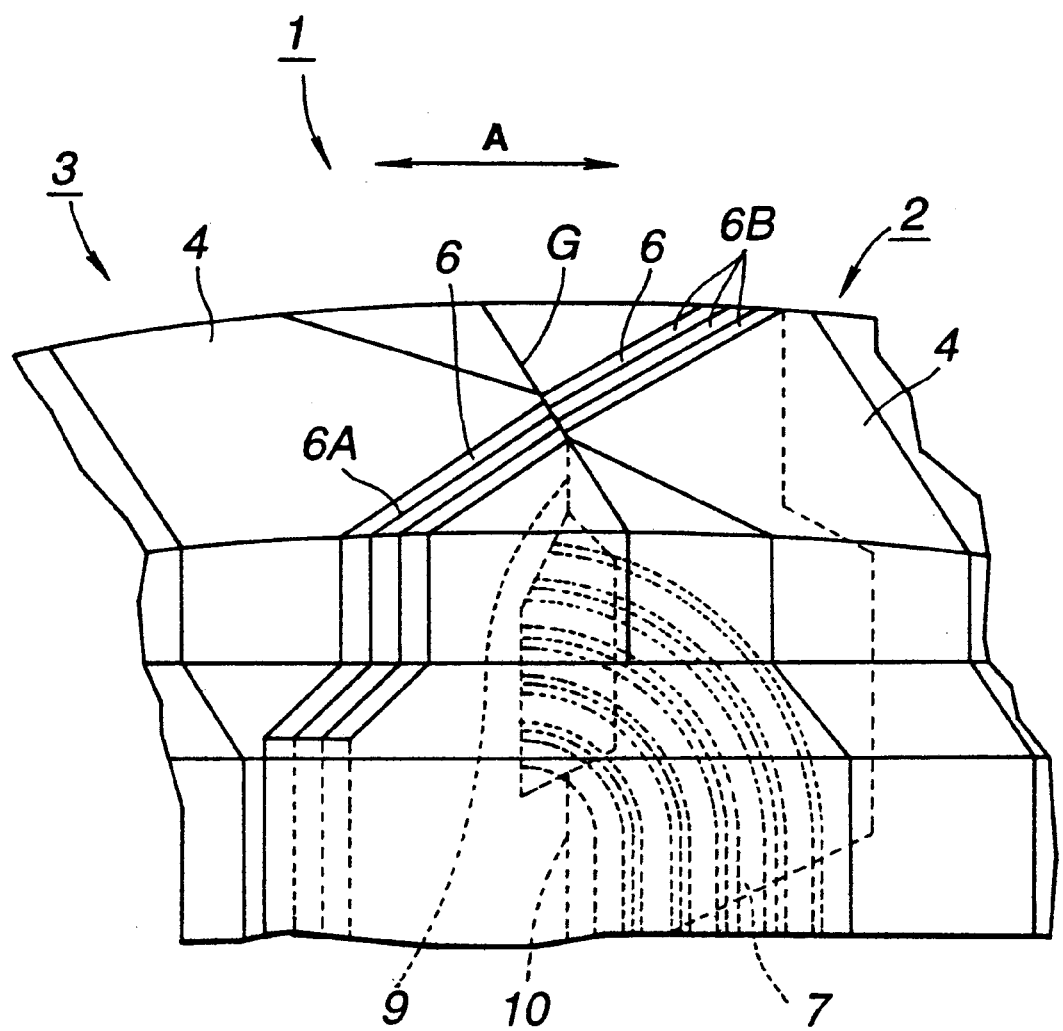
FIG. 3 is a perspective view showing essential portions of a magnetic head according to the present invention.
Figure 4:
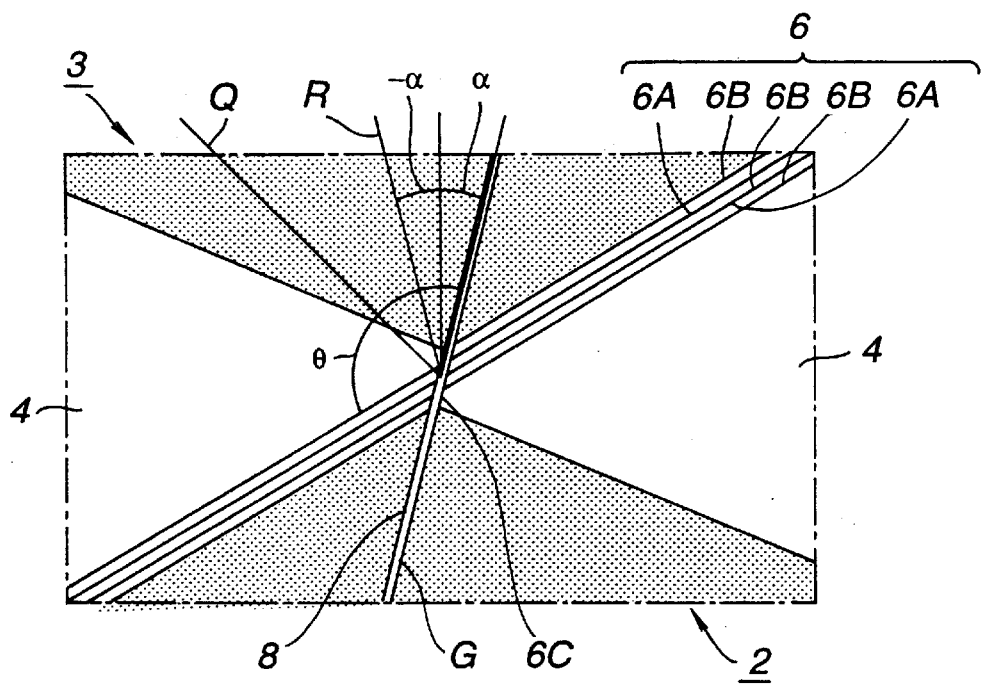
FIG. 4 is a plan view showing essential portions of the magnetic head shown in FIG. 3.

A magnetic head 1 according to the present invention is made up of a pair of magnetic head halves 2, 3 bonded together with a non-magnetic gap material G in-between, as shown in FIGS. 3 and 4. These magnetic head halves 2, 3 are each made up of a non-magnetic substrate 4 and a magnetic metal film 6 formed thereon. On at least one of the paired magnetic head halves 2, 3 is formed a coil 7 for magnetic excitation or detection of an induced voltage. In this magnetic head 1, the magnetic metal film 6 forms a magnetic core in such a state in which the paired magnetic head halves 2, 3 are bonded together with the gap material G in-between. On the magnetic head 1 is slid a magnetic recording medium in a direction shown by arrow A in FIG. 3, with the magnetic head halves 2, 3 being bonded together, thus reproducing the signal magnetic field recorded on the magnetic recording medium or recording the signal magnetic field on the magnetic recording medium.

In the present magnetic head 1, the magnetic metal film 6 is formed obliquely at a pre-set angle on the non-magnetic substrate 4. Thus, when the paired magnetic head halves 2, 3 are bonded together via a gap material G in-between, the magnetic core is arranged obliquely relative to the sliding direction of the magnetic recording medium.

In the present magnetic head 1, the magnetic metal film 6 is made up of three magnetic metal layers 6B, layered together via non-magnetic layers 6A in-between. The magnetic metal films 6 formed on the paired magnetic head halves 2, 3 are bonded together for facing each other via a gap material G for forming a magnetic gap. The magnetic head of the present invention is, however, not limited to the three magnetic metal layers 3B layered together as in the present embodiment.

When the magnetic metal films 6 in the magnetic head 1 are bonded together via the gap material G, these magnetic metal films 6 are offset relative to one another, as shown in FIG. 4. On a junction surface 8, forming the magnetic gap, the non-magnetic substrate 4 is exposed to one end 6C of the magnetic metal film 6, so that, when the paired magnetic head halves 2, 3 are bonded together via the gap material G, the magnetic metal film 6 of the magnetic head half 2 faces the non-magnetic substrate 4 of the opposite side magnetic head half 3 exposed on the junction surface 8.

The portion of the magnetic metal film 6 exposed to outside of the magnetic recording medium facing surface is cut out so as to reduced in width and is formed with a coil-forming recess, not shown, for forming the coil 7. The coil 7 is formed of an electrically conductive metal material by a thin film forming technique, such as an electrolytic plating method.

In the magnetic head halves 2, 3, the non-magnetic substrate 4 is formed of a non-magnetic material, for example, MnO—NiO based material, only by way of an example. That is, it suffices if the non-magnetic substrate 4 is formed of calcium titanate, barium titanate, zirconium oxide (zirconia), alumina, alumina titanium carbide, $SiO_2$, Zn ferrite, crystal glass or hard glass. The magnetic metal film 6 may be of a magnetic metal material, such as Fe—Al—Si alloy (sendust), only by way of example. Thus, it suffices if the magnetic metal film 6 is formed of crystal alloys, such as a Fe—Al alloy, Fe—Si—Co alloy, a Fe—Ga—Si alloy, Fe—Ga—Si—Ru alloy, Fe—Al—Ge alloy, Fe—Ga—Ge alloy, Fe—Si—Ge alloy, Fe—Co—Si—Al alloy or a Fe—Ni alloy. Alternatively, it may be a metal-metalloid based amorphous alloy, typified by an alloy comprised of one or more of elements Fe, Co and Ni and one or more elements P, C, B and Si, or an alloy mainly composed of these elements and also containing Al, Ge, Be, Sn, In, Mo, W, Ti, Mn, Counter-azimuth direction R, Zr, Hf and Nb, or an amorphous alloy, typified by a metal-metal based amorphous alloys, mainly composed of transition metals, such as Co, Hf or Zr and rare-earth elements.

In recording signals on a magnetic recording medium or reproducing a signal magnetic field by the above-described magnetic head 1 of the present embodiment, a magnetic core is defined by a front gap 9 and a back gap 10 which are formed on bonding the above-mentioned paired magnetic metal films 6.

In the present embodiment of the magnetic head, the paired magnetic metal films 6 are bonded together with a shift (offset) relative to each other, as described above. In the magnetic head 1, the azimuth angle and the counter-azimuth angle are denoted by α and −α, respectively. The counter-azimuth angle herein means an angle having the same value as the azimuth angle α and the direction perpendicular to the medium sliding direction on the medium sliding surface as an axis of symmetry.

In the present magnetic head 1, the magnetic metal films 6 are bonded together with a relative shift or offset therebetween. By this shift, a track offset angle θ (FIG. 4) is produced. In this magnetic head 1, a non-magnetic substrate 4 is exposed at an end 6C of the magnetic metal film 6 on a junction surface 8 defining the magnetic gap. That is, in the present magnetic head 1, the magnetic metal film 6 exposed on one junction surface 8 faces the non-magnetic substrate exposed to the opposite side junction surface 8. The result is that this magnetic head 1 has a large track offset angle θ.

If the magnetic head 1 has this large track offset angle θ, the recording fringing can be suppressed to a lower value. Therefore, the magnetic head 1 is free from such an inconvenience that neighboring tracks are simultaneously reproduced during reproduction, thus assuring superior playback characteristics.

Moreover, with the present magnetic head 1, since the paired magnetic metal films 6 are bonded together with a relative shift in a pre-set direction, as described above, it becomes possible to increase the angle defined between the counter-azimuth direction indicated by a straight line R in FIG. 4 and the bisector of the track shift angle indicated by a straight line Q in FIG. 4.

With the larger angle between the counter-azimuth direction R and the bisector Q of the track shift angle, the playback fringing of the magnetic head 1 can be suppressed to a lower value. Thus, the present magnetic head 1 is free from an inconvenience that neighboring tracks are reproduced during playback thus assuring superior reproducing characteristics.

The magnetic head of the present invention is not limited to the above-described embodiment. Thus, the magnetic head 1 may be progressively reduced in thickness towards the junction surface to the magnetic metal film 6. That is, with the present magnetic head, a cut-out 6D is formed on an end of the magnetic metal film 6 opposite to its end in contact with the non-magnetic substrate 4. In this case, the magnetic head 1 again has a structure in which the magnetic metal film 6 making up one 2 of the magnetic head halves faces the non-magnetic substrate 4 of the opposite side magnetic head half exposed to the junction surface 8. Moreover, with the present magnetic head 1, since the magnetic metal film 6 is progressively reduced in thickness towards the junction surface 8, the magnetic flux density is concentrated towards the magnetic gap.

Figure 5:
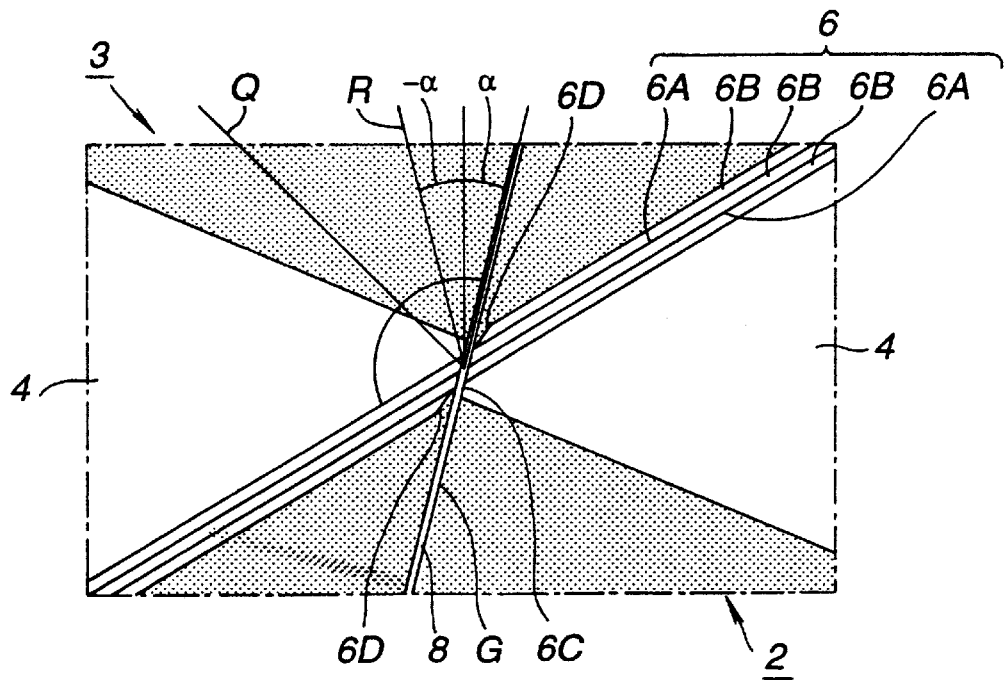
FIG. 5 is a plan view showing essential portions of another magnetic head according to the present invention.

With the magnetic head 1 shown in FIG. 5, similarly to the magnetic head of the previous embodiment, the recording fringing and playback fringing can be suppressed to smaller values. Also, in the present magnetic head 1, since the magnetic flux density is concentrated towards the magnetic gap, not only can the magnetic field of low intensity be detected, but the high-density magnetic field can be produced. Thus, the magnetic head 1 has high sensitivity suitable for high density recording.

Figure 6:
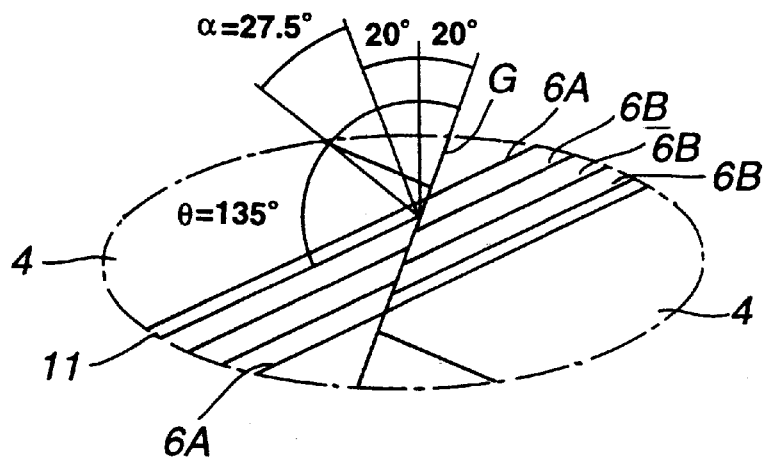
FIG. 6 is a plan view showing essential portions of still another magnetic head according to the present invention.

Also, in the magnetic head 1 of the present invention, an underlying layer 11 may be provided between the magnetic metal film 6 and the non-magnetic substrate 4, as shown in FIG. 6. This underlying layer 11 operates as an index layer for high-accuracy positioning of the magnetic metal film 6 formed on each of the magnetic head halves 2, 3 when bonding these magnetic head halves together.

This underlying layer 11 may be enumerated by oxide films, such as $Al_2O_3$, SiO, $SiO_2$, $ZrO_2$ or $Cr_2O_3$, a glass film, metal films, such as Au or Cu films, either singly or as layered structures.

Figure 7:
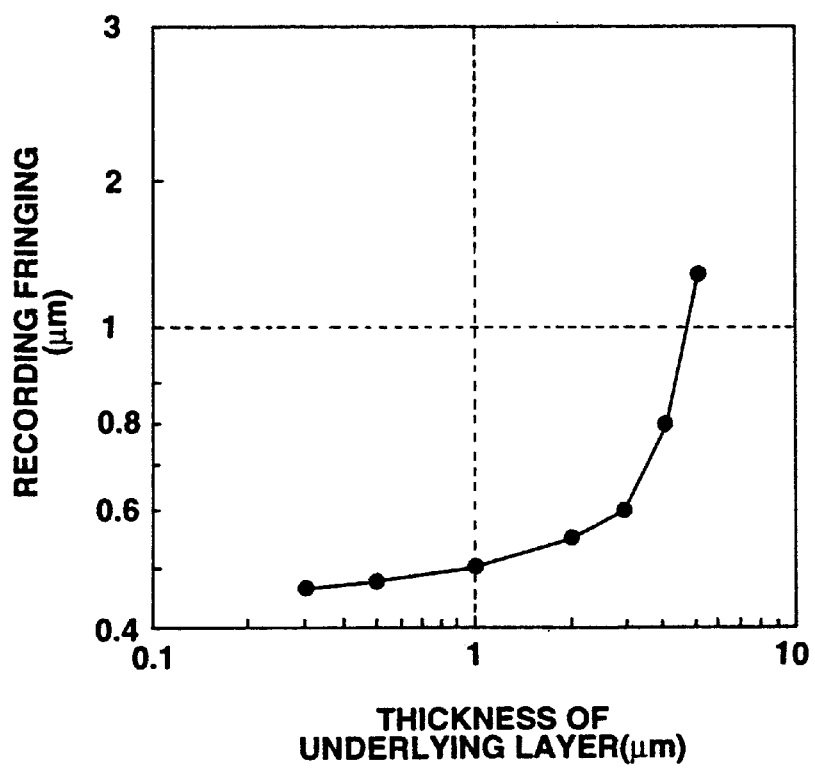
FIG. 7 is a graph showing the elation between the film thickness of an underlying layer and recording fringing in a magnetic head shown in FIG. 4.

FIG. 7 shows the relation between the film thickness of the underlying layer 11 and recording fringing. As may be seen from FIG. 7, the film thickness of the underlying layer 11 is preferably 0.3 μm to 4.0 μm and more preferably 0.5 to 1.5 μm. If the underlying layer 11, acting as an index layer, has a film thickness less than 0.3 μm, difficulties are encountered as to distinguishment form the non-magnetic substrate 4. If the underlying layer 11 has a film thickness larger than 4.0 μm, recording fringing is undesirably increased.

Similarly to the above-described magnetic head, the magnetic head shown in FIG. 6 is superior in playback fringing and in recording fringing, and hence in recording/reproducing characteristics.

Also, the underlying layer 11 is preferably formed of a material colored differently from the non-magnetic substrate 4 or the magnetic metal films 6. This assures more reliable distinguishment of the underlying layer 11 from the non-magnetic substrate 4 or the magnetic metal films 6.

Figure 8:
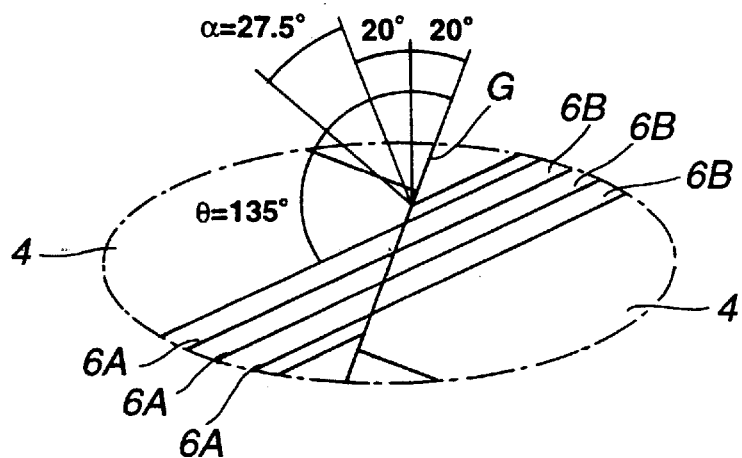
FIG. 8 is a plan view showing essential portions of still another magnetic head according to the present invention.

It is also possible for the magnetic head of the present invention to have the magnetic metal films 6 the uppermost layer of which is reduced in thickness as compared to the remaining layers, as shown in FIG. 8. The present magnetic head, shown in FIG. 8, has four magnetic metal films 6 that are formed of the above-mentioned materials. That is, the present magnetic head has, on the non-magnetic substrate 4, a first magnetic metal layer 12, a second magnetic metal layer 13, a third magnetic metal layer 14 and a fourth magnetic metal layer 15, layered in this order with a non-magnetic layer 6B between the neighboring layers 12 to 15.

With the present magnetic head, the fourth magnetic metal layer 15 is thinner in thickness than the first magnetic metal layer 12, second magnetic metal layer 13 or the third magnetic metal layer 14. Specifically, the first to third magnetic metal layers 12 to 14 are 4.0 μm in thickness, whereas the fourth magnetic metal layer 15 is 1.0 m in thickness, with the non-magnetic layer 6B being 1.0 μm in thickness.

With the present magnetic head, the uppermost one of the plural magnetic metal layers is reduced in thickness, so that, when bonding the magnetic head halves 2 and 3 together, the magnetic metal films 6 formed thereon can be abutted against each other with improved accuracy.

Figure 9:
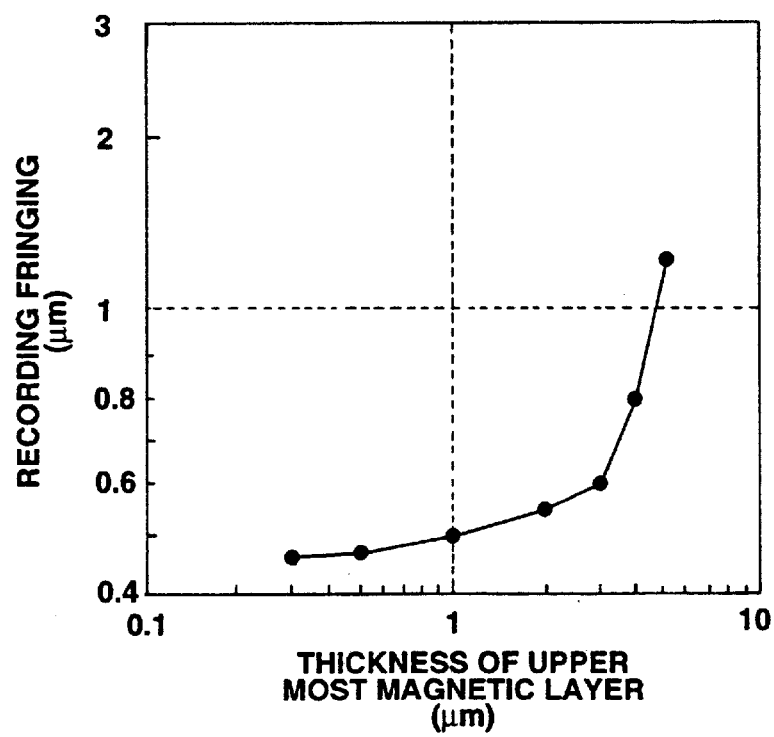
FIG. 9 is a graph showing the elation between the film thickness of an uppermost magnetic metal layer and recording fringing in the magnetic head shown in FIG. 6.

FIG. 9 shows the relation between the film thickness of the uppermost magnetic metal layer and recording fringing of the above-described magnetic head. As may be seen from FIG. 9, the film thickness of the uppermost magnetic metal layer is preferably 0.3 μm to 4.0 μm and more preferably 0.5 m to 2.0 μm. If, with the present magnetic head, the film thickness of the uppermost magnetic metal layer is less than 0.3 μm, magnetic properties of the magnetic metal films are lowered.

Similarly to the above-described magnetic head, the magnetic head shown in FIG. 8 is superior in playback fringing and recording fringing and hence in recording/reproducing characteristics.

The method for manufacturing the magnetic head 1 according to the above-described embodiment is now explained by referring to the drawings.

For manufacturing the magnetic head 1, plural magnetic head halves 2, 3 are formed on one substrate. A pair of the substrates are bonded together and the resulting unit is sliced into plural magnetic heads 1.

Figure 10:
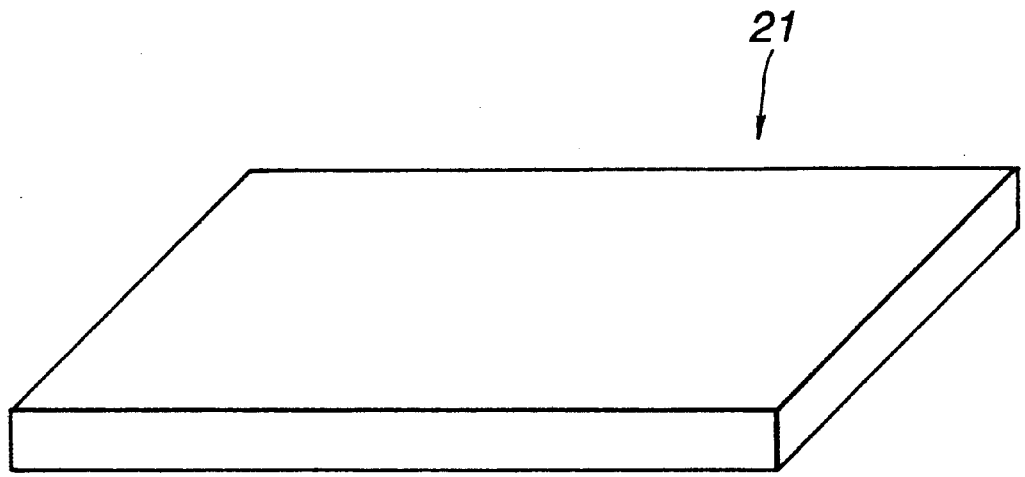
FIGS. 10 to 18 are perspective views showing the manufacturing process for manufacturing a magnetic head according to the present invention.

For manufacturing the magnetic head 1, a substantially flat-plate-shaped substrate 21 is provided, as shown in FIG. 10. This substrate 21 proves to be a non-magnetic substrate 4 of the magnetic head 1 and is formed of, for example, a non-magnetic material, such as MnO—NiO. This substrate 21 is approximately 2 mm in thickness and approximately 30 mm in length and width.

Figure 11:
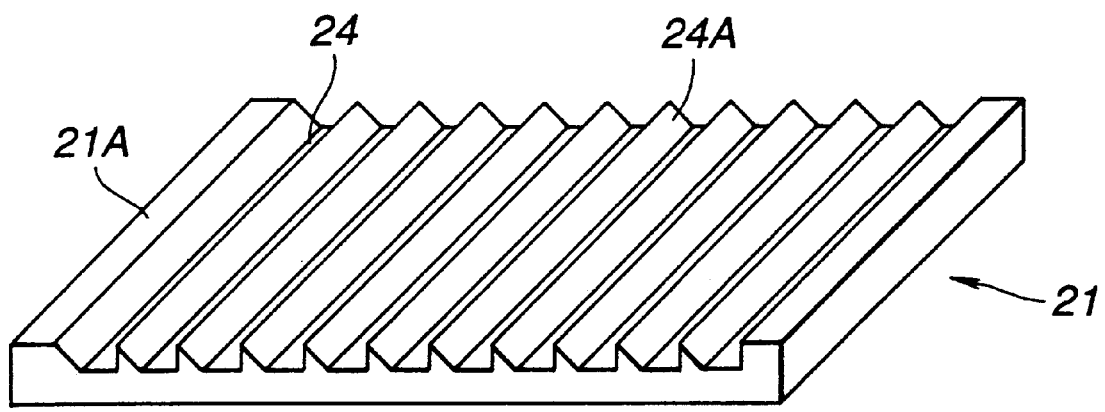
Figure 12:
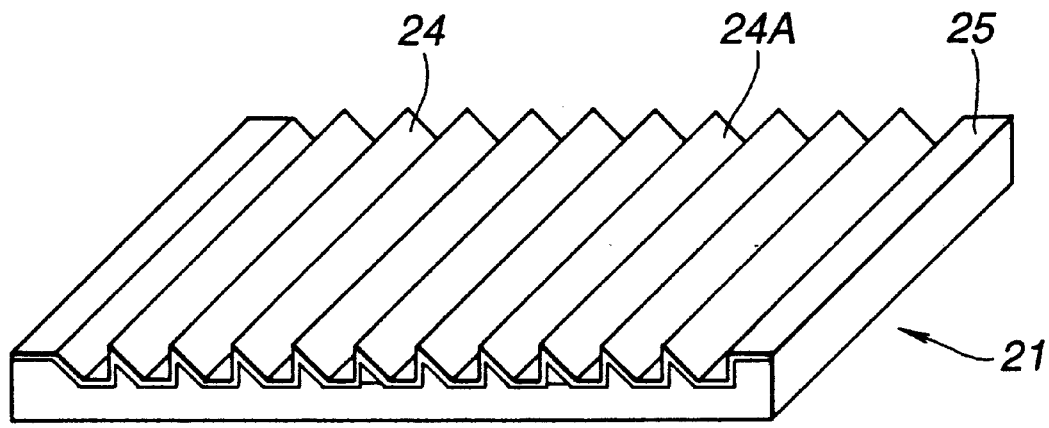

Next, first grooving is applied to one of the major surfaces 21A of the substrate 21, as shown in FIG. 11. During this first grooving, plural magnetic core forming grooves 24, inclined by, for example, 45°, are formed in the major surface 21A by, for example, a grindstone, for extending parallel to one another. Plural inclined surfaces 24A are formed by these magnetic core forming grooves 24 prepared by the first grooving.

Although the inclined surfaces 24A are preferably inclined by 25 to 60°, the inclination angle of 35 to 50° is more preferred in view of the pseudo-gap and track width precision. The magnetic core forming groove 24, prepared by the first grooving, is 130 μm n depth and 150 m in width.

Then, a magnetic metal film 25, formed of the above-mentioned materials, is then formed on the surface of the substrate 21 formed with the inclined surfaces 24A. During this film-forming process, the magnetic metal film 25 is formed to the uniform film thickness on the major surface formed with the inclined surfaces 24A. The magnetic metal film 25 is formed so that three layers of the magnetic metal material will be layered with non-magnetic layers in-between. This film-forming process is carried out by, for example, a PVD method, such as magnetron sputtering, or a CVD method.

The magnetic metal film 25 may also be formed by a single magnetic metal layer, instead f by plural magnetic metal layers If, in the present embodiment, the magnetic metal film 25 is formed by plural layers, it is made up of three Fe—Al—Si alloy layers, formed by alternately layered Fe—Al—Si (sendust) each being 4 μm in thickness and alumina layers each being 0.15 μm in thickness. If the magnetic metal film 25 is made up of plural layers, the non-magnetic layer is formed of alumina, $SiO_2$ or SiO, either singly or in combination. The non-magnetic layer needs to be of a film thickness assuring insulation between magnetic metal layers disposed on its both sides.

If this technique is used for manufacturing the magnetic head as shown in FIG. 6, an underlying layer is formed between the magnetic metal film 25 and the substrate 21.

Also, if this technique is used for manufacturing the magnetic head as shown in FIG. 8, the film thickness of the uppermost magnetic metal layer of the magnetic metal film 25 is selected to be thinner than that of other magnetic metal layers.

Figure 13:
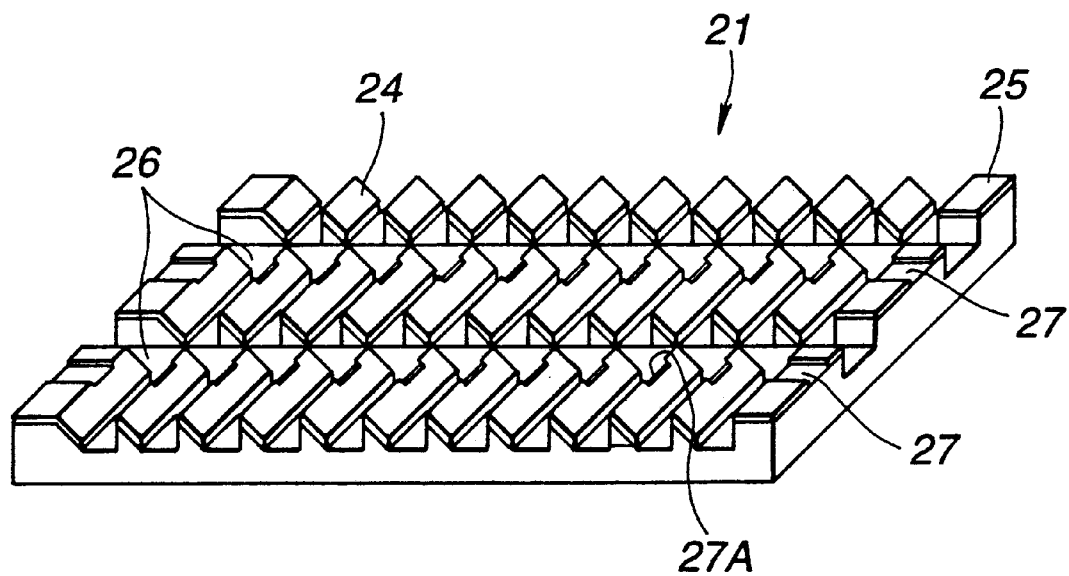

Then, as shown in FIG. 13, second grooving is applied to the surface of the substrate formed with the magnetic metal film 25 in a direction substantially perpendicular to the magnetic core forming groove 24. During this second grooving, a number of separating grooves 26 are formed for separating the substrate into plural magnetic cores of desired size. Also, a winding slot 27 is formed in each magnetic core for forming a coil-forming recess.

This separating groove 26 is used for magnetically separating the magnetic core on the substrate 21 in the fore-and-aft direction for delimiting the magnetic core for forming a closed magnetic path in each magnetic core. Although two separating grooves 26 are formed in the embodiment of FIG. 13, it is necessary to from a number of the separating grooves 26 equal to the number of columns of the magnetic head halves 2, 3. Also, the separating groove 26 needs to be formed to a depth sufficient to permit severing the magnetic metal film 25 for magnetically separating the magnetic cores arranged in the fore-and-aft direction. Specifically, the separating groove 26 needs to be deeper by 150 µm from the bottom side of the magnetic core forming groove, that is 280 µm in depth.

On the other hand, the winding slot 27 needs to be of a depth such as not to sever the magnetic metal film 25, in order to form the magnetic core having the front gap 9 and the back gap 10 and for forming the coil-forming recess. The winding slot 27, having its shape determined responsive to the lengths of the front gap 9 and the back gap 10, is of the width of the order of approximately 140 µm, with the front gap 9 and the back gap 10 being approximately 300 µm and approximately 85 µm, respectively. The winding slot 27 of a depth not severing the magnetic metal film 25 suffices. If the winding slot 27 is of an excessive depth, the magnetic flux transmission efficiency tends to be lowered due to the increased magnetic path length. The depth of the winding slot 27, which depends on the thickness of the coil 7 formed by the process which will be explained subsequently, is herein set to approximately 20 µm. Although the winding slot 27 is not limited to any specific shape, the surface 27 thereof towards the front gap 9 is herein designed as an inclined surface of approximately 45°. This gives a structure of the magnetic metal film 6 in which the magnetic flux is concentrated towards the front gap 9 thus assuring improved sensitivity.

Figure 14:
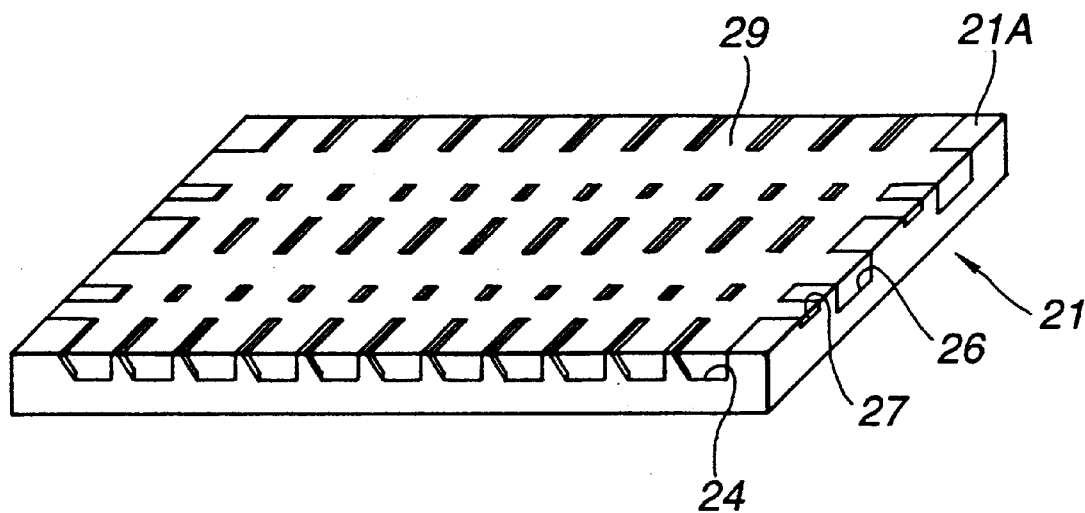

Then, as shown in FIG. 14, a low melting glass 29 is charged onto a major surface of the substrate 21 formed with the magnetic core forming groove 24, separating groove 26 and the winding slot 27, as explained previously. Then, surface planarizing is applied to the major surface of the substrate 21 charged with the low-melting glass 29.

In the manufacturing method for the magnetic head according to the present invention, grinding is applied to the major surface charged with the low-melting glass, using a grindstone, thereby planarizing the major surface. This planarizing is carried out substantially until the substrate is exposed to the front gap 9.

If the substrate 21, exposed by this grinding process, is of a larger width, the etching rate for the substrate 21 differs from that for the low-melting glass, such that a step difference tends to be produced on the boundary between the substrate 21 and the low-melting glass. Therefore, the width of the substrate 21 exposed by this grinding process is preferably smaller than the width of the innermost rim of the coil 7 formed by the process which will be explained subsequently.

Figure 15:
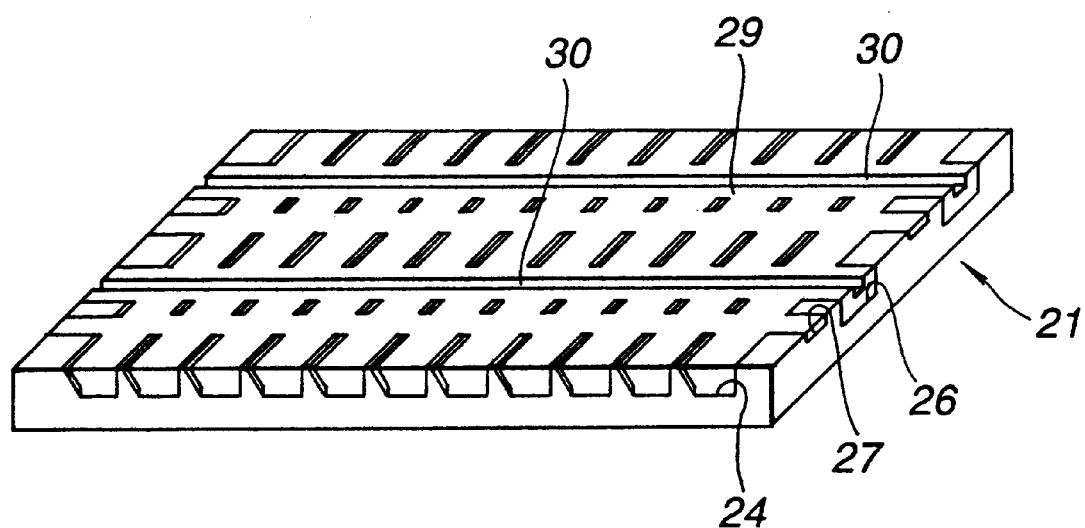

Then, as shown in FIG. 15, a terminal groove 30 is formed by grinding using a grindstone. This terminal groove 30 is formed so as to directly overlie the above-mentioned separating groove 26 and is approximately 100 µm in both width and depth. Within this terminal groove 30 is charged a good electrically conductive material, such as Cu, by e.g., a plating method. Next, the planarizing is applied.

Figure 16:
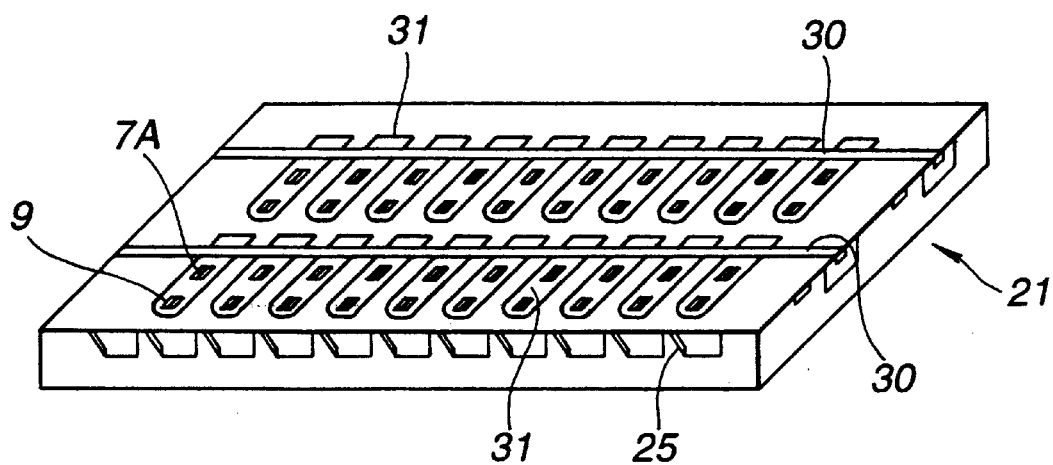

Then, as shown in FIG. 16, a coil 7, centered about the back gap 10, is formed, in a manner not shown in FIG. 16. For forming this coil 7, a coil-forming recess 31 having a depth of, for example, 5 µm, is formed in the planarized low-melting glass 29 by e.g., etching.

Within this coil-forming recess 31 is then formed the photoresist patterned to a desired coil shape. The coil 7 is then formed, using e.g., electrolytic plating using an electrically conductive material such as Cu. The desired col 7 is formed by removing the resist. At this time, the coil 7 is formed so as to be electrically connected to the good conductor charged in the terminal groove 30 formed in the above-mentioned step. The coil 7 can be formed by sputtering or vapour deposition, without being limited to the method described above.

Then, a protective layer, not shown, for protecting the coil 7 from contact with atmosphere is formed. This protective layer is formed for burying the coil-forming recess 31 formed for producing the coil 7. Then, planarizing is applied to the surface formed with the protective layer. This generates a coil contacting portion electrically connecting the front gap 9, back gap 10 and the coil 7 so that the coil contacting portion will be exposed to outside.

The substrate 21 is then sliced so that the plural magnetic head halves 6, formed simultaneously, will be arrayed transversely in a line, for forming magnetic head half blocks 32.

Figure 17:
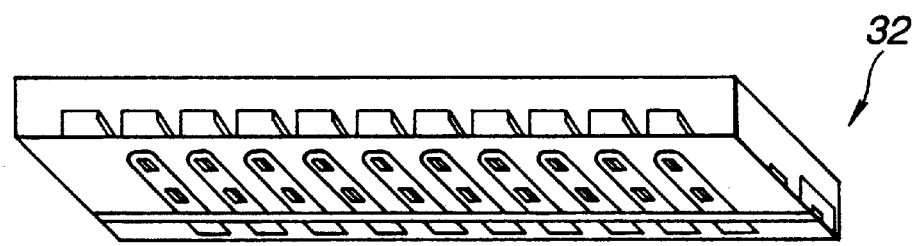
Figure 17:
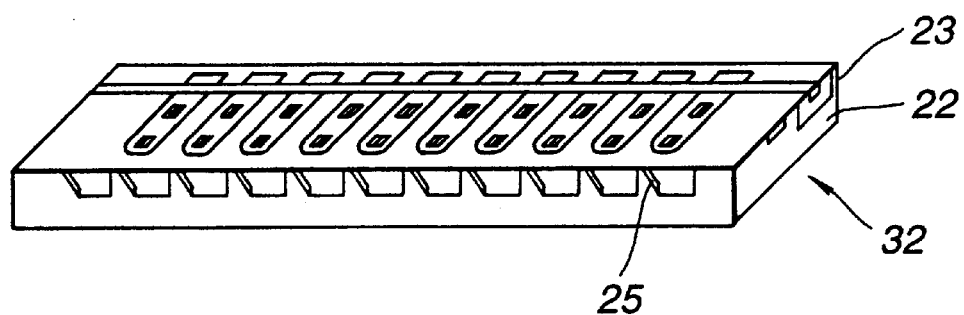

A pair of the magnetic head half blocks 32 are bonded together, as shown in FIG. 17. At this time, the paired magnetic head half blocks 32 are positioned so that the major surfaces thereof formed with the protective layers 31 will face each other and so that the back gap 9 and a coil connection terminal 7A will face a pre-set portion. With this metal diffusion bonding method, the portions of the paired magnetic head half blocks 32 that need to be electrically connected to each other can be connected reliably.

In the present embodiment of the manufacturing method for manufacturing the magnetic head, the paired magnetic head half blocks 32 are connected together so that the portion of the substrate 21 exposed to the front gap 9 of one of the magnetic head half blocks 32 will face the portion of the magnetic metal film 25 exposed to the front gap 9 of the other magnetic head half block 32. That is, with this technique, the paired magnetic head half blocks 32 are bonded together with one of the magnetic head half blocks 32 shifted in the direction of the inclined surfaces 24A.

If, in the present technique, the magnetic head half blocks formed with underlying layers are used, the underlying layer formed on one of the magnetic head half blocks and the uppermost magnetic metal layer formed on the opposite side magnetic head half block are brought into registration correctly with each other when bonding the paired magnetic head half blocks. This gives paired magnetic head half blocks shaped as shown in FIG. 6.

Conversely, if there is formed no underlying layer, it may be an occurrence that the relative shift opposite to that shown in FIG. 4 is produced. That is, if the paired magnetic head half blocks 32 are bonded together with the respective magnetic metal layers as reference, the boundary between the magnetic metal layers and the substrate is difficult to recognize such that difficulties are met in improving the bonding accuracy.

Thus, the paired magnetic head half blocks can be bonded together more easily and to higher accuracy by employing magnetic head half blocks formed with the underlying layer.

If, in the present technique, the film thickness of the uppermost magnetic metal layer is smaller than that of the other magnetic metal layer, specifically, if the magnetic head shown in FIG. 8 is produced, it suffices if the magnetic head half blocks are abutted to each other with the first magnetic metal layer 12 of one of the magnetic head halves 2 and the third magnetic metal layer 14 of the opposite magnetic head half 3 as reference and with the third magnetic metal layer 14 of one of the magnetic head halves 2 and the first magnetic metal layer 12 of the opposite side magnetic head half 3 as reference.

Since the third magnetic metal layer 14 of one of the magnetic head halves 2 and the first magnetic metal layer 12 of the opposite side magnetic head half 3 are abutted to each other, the magnetic gap is of the desired size, even if the third magnetic metal layer 14 and the first magnetic metal layer 12 become offset in any direction, because of the presence of the fourth magnetic metal layer 15. The paired magnetic head half blocks 32 can be connected to each other to higher accuracy by setting the reference used when connecting the paired magnetic head half blocks 32 to each other.

Figure 18:
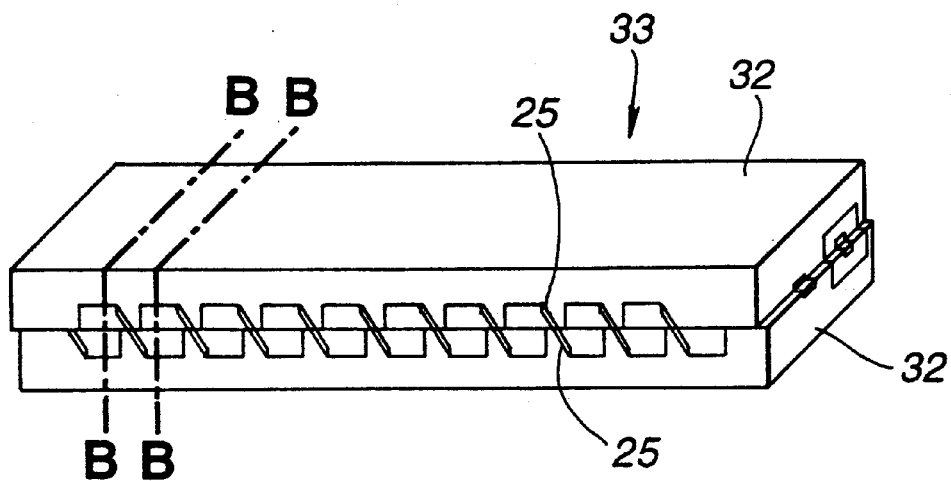
Figure 19:
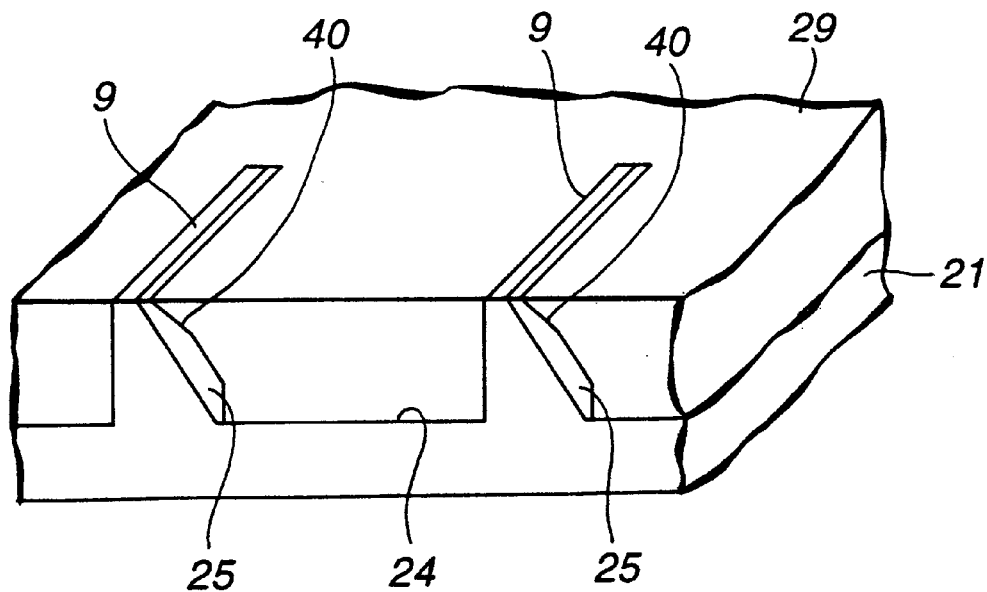
FIG. 19 is a perspective view showing the manufacturing process for manufacturing another magnetic head according to the present invention.

Then, as shown in FIG. 18, a magnetic head block 33, produced on connecting the paired magnetic head half blocks 32 to each other, as described above, is separated into individual magnetic heads. At this time, the magnetic head block 33 is sliced along lines B—B in FIG. 18. This gives a magnetic head 1 having a magnetic gap between the front gaps 9. The medium sliding surface of the magnetic head 1 is then ground, in a manner not shown, so as to produce a cylindrical surface. The medium sliding surface is also formed with an abutment controlling groove for assuring optimum abutment characteristics against the magnetic recording medium. This abutment controlling groove is formed so as to be substantially parallel to the sliding direction of the magnetic recording medium for controlling the friction against the magnetic recording medium.

In the above-described manufacturing method for the magnetic head, grinding is applied, at the time of the planarizing processing following the charging of the low-melting glass 29, so that the substrate 21 will be exposed to the front gap 9. When bonding the magnetic head half blocks 32 together, part of the substrate 21 exposed to the front gap 9 faces part of the magnetic metal film 25 exposed to the opposite side front gap 9.

Thus, with the present technique, the magnetic head 1 can be produced which has a large track offset angle θ and a large angle between the counter-azimuth direction R and the bisector Q of the track offset angle. Thus, with the present technique, the magnetic head 1 can be produced which is optimum in recording fringing and playback fringing and superior in recording/reproducing characteristics.

The manufacturing method for the magnetic head according to the present invention is not limited to the above-described method for manufacturing the magnetic head 1 and may also be a method for manufacturing the magnetic head shown in FIG. 5.

In this case, the magnetic core forming groove 24, separating groove 26 and the winding slot 27 are similarly produced, as shown in FIG. 13. The low-melting glass 29 is then charged into these grooves. Then, grinding is applied to the outer portion of the magnetic metal film 25, using a grindstone having one face cut by approximately 35°, for forming a cut-out 40. The portion of the substrate thus ground is then charged with the low-melting glass 29.

In this state, planarization is applied as in the above-described embodiment. This planarizes the connecting surface while exposing a portion of the substrate on the connecting surface. The magnetic head is then produced in the same way as in the above-described manufacturing process.

With the above-described manufacturing method for the magnetic head, a magnetic head can be produced in which recording fringing and playback fringing can be suppressed to lower values. In addition, by this technique, such a magnetic head can be produced in which the magnetic metal film 25 is progressively reduced in thickness towards the magnetic gap. Thus, with the magnetic head, manufactured by this technique, since the magnetic flux density can be concentrated towards the magnetic gap, the magnetic head can be improved in recording/reproducing sensitivity.

Tests were conducted on the magnetic head according to the present invention and magnetic heads of comparative examples for evaluating characteristics of the magnetic heads.

Figure 20:
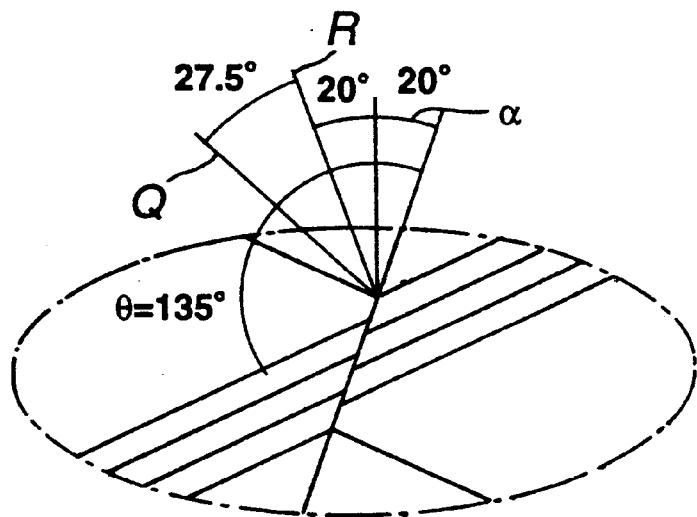
FIG. 20 is a plan view showing essential portions of a sample A used in evaluating the recording fringing and reproducing fringing of a magnetic head according to the present invention.

As a magnetic head embodying the invention, a sample A having a track offset angle θ equal to 135° and the azimuth angle α equal to 20° was produced, as shown in FIG. 20. In this sample A, the angle defined between the counter-azimuth direction R and the bisector Q of the track offset angle was 27.5°.

For comparison with the magnetic heads of the comparative examples, samples B to D were produced. The sample B was produced by shifting paired magnetic head halves 2, 3 in an opposite direction to the sample A. The samples C and D were fabricated so that the substrate 4 is not exposed on the junction surface and so that only the magnetic metal films 6 face each other.

Figure 21:
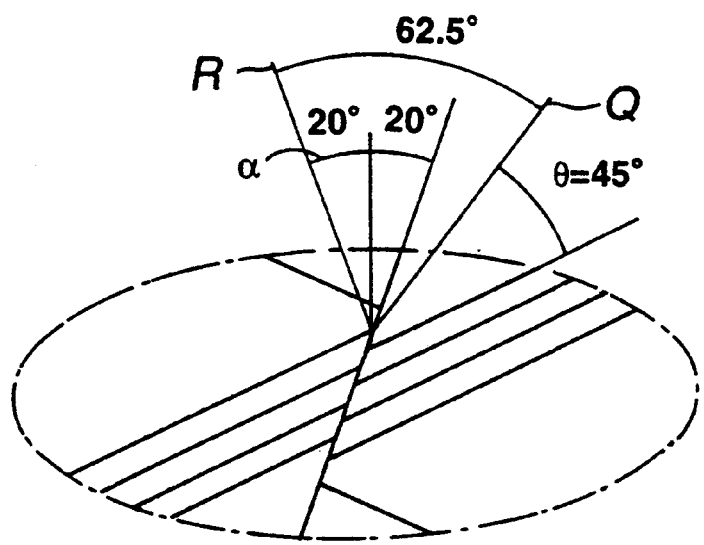
FIG. 21 is a plan view showing essential portions of a sample B used in evaluating the recording fringing and reproducing fringing of the magnetic head according to the present invention.
Figure 22:
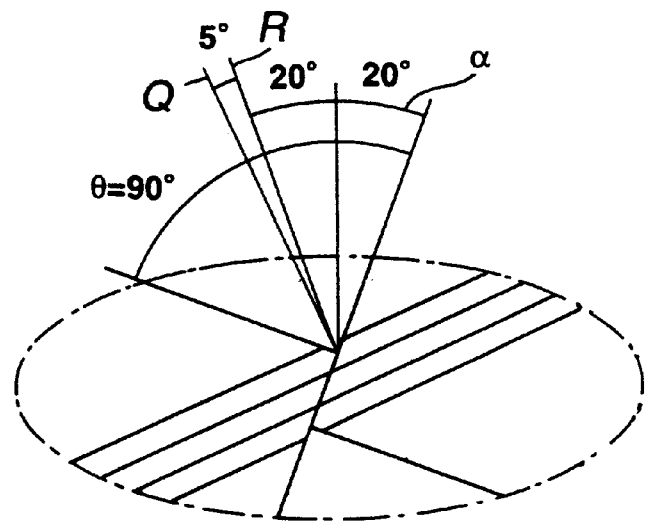
FIG. 22 is a plan view showing essential portions of a sample C used in evaluating the recording fringing and reproducing fringing of a magnetic head according to the present invention.
Figure 23:
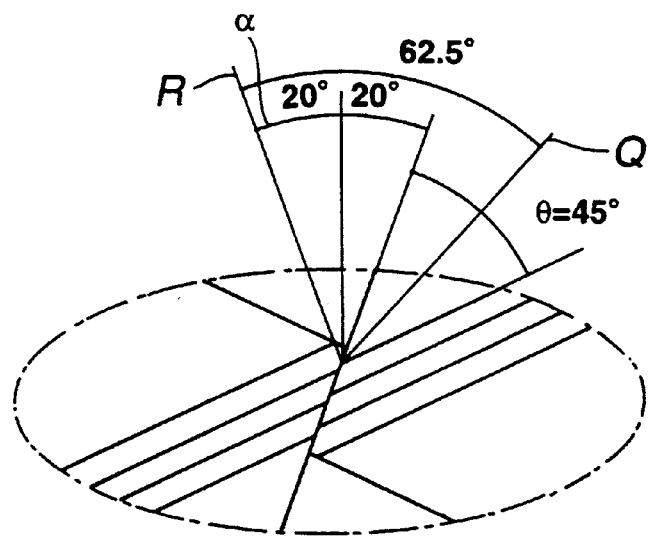
FIG. 23 is a plan view showing essential portions of a sample D used in evaluating the recording fringing and reproducing fringing of a magnetic head according to the present invention.
Figure 24:
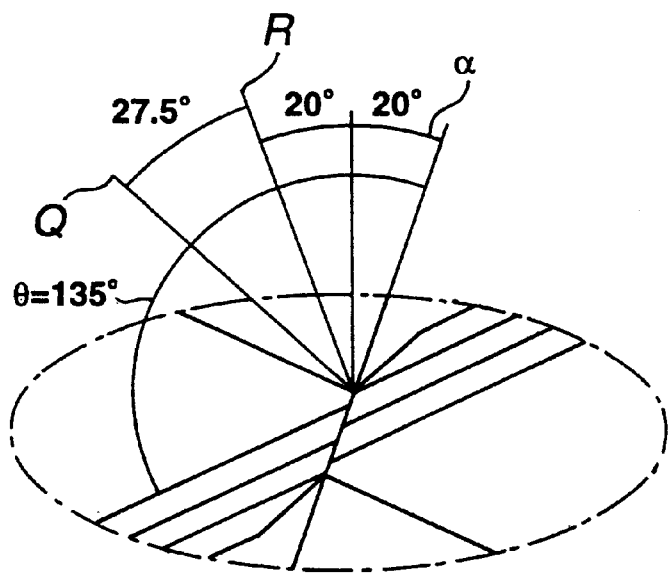
FIG. 24 is a plan view showing essential portions of a sample E used in evaluating the recording fringing and reproducing fringing of an other magnetic head according to the present invention.

In the sample B, the track offset angle θ is 45°, while the angle between the counter-azimuth direction R and the bisector Q of the track offset angle is 62.5°, as shown in FIG. 21. In the sample C, the track offset angle θ is 90°, while the angle between the counter-azimuth direction R and the bisector Q of the track offset angle is 5°, as shown in FIG. 22, whereas, in the sample D, the track offset angle θ is 45°, while the angle between the counter-azimuth direction R and the bisector Q of the track offset angle is 62.5°, as shown in FIG. 23.

The recording fringing and the playback fringing were measured of these samples A to D. The results are shown in Table 1.

TABLE 1

|  | recording fringing | playback fringing |
| --- | --- | --- |
| sample A | 0.5 μm | 0.7 dB |
| sample B | 2.0 μm | 0.5 dB |
| sample C | 1.0 μm | 2.5 dB |
| sample D | 2.0 μm | 0.5 dB |

The recording fringing was evaluated by measuring the erasure width of neighbouring tracks using a digital camcorder for household use. The playback fringing was evaluated, by measuring, using a digital camcorder for domestic use, the difference in the noise level between the case of reproducing a medium having signals recorded in the neighboring tracks and the case of reproducing a medium having no signals recorded in the neighboring tracks.

As may be seen from Table 1, the sample A according to the present invention is low in both the recording fringing and playback fringing and hence has superior recording/reproducing characteristics.

The sample B is low in playback fringing because of a large angle between the counter-azimuth direction R and the bisector Q of the track offset angle. However, the recording fringing of the sample B is of a high value because of the small track offset angle θ. Thus, the sample B, having good playback characteristics, is not superior in recording characteristics.

The sample C, having the large track offset angle θ and hence the low recording fringing, has a higher playback fringing value, because of a small angle defined between the counter-azimuth direction R and the bisector Q of the track offset angle. Thus, the sample C, having good recording characteristics, is not optimum in playback characteristics.

The sample D has the angle defined between the counter-azimuth direction R and the bisector Q of the track offset angle θ and the track offset angle θ equal to those of the sample B. Thus, the sample D has the recording fringing and playback fringing equal in values to those of the sample B and hence has good reproducing characteristics, without being optimum in recording characteristics.

Figure 25:
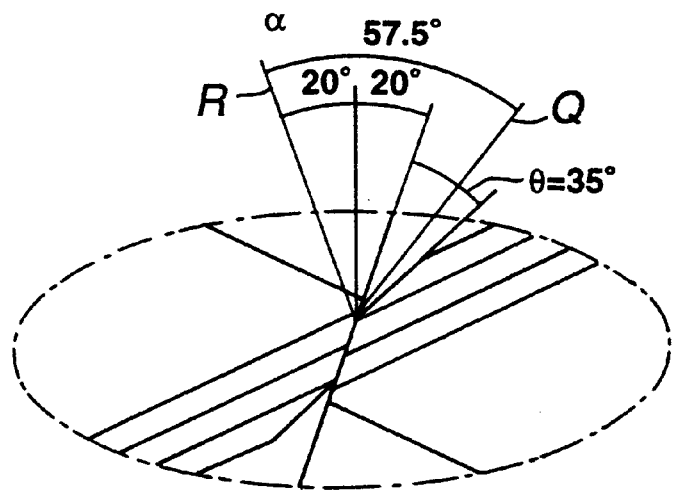
FIG. 25 is a plan view showing essential portions of a sample F used in evaluating the recording fringing and reproducing fringing of the other magnetic head according to the present invention.

In connection with the magnetic head of an alternative embodiment shown in FIG. 5, a sample E having a track offset angle θ of 135° and the azimuth angle α of 20° was produced. For comparison with the sample E, a sample F, having an offset in the opposite direction to that of the sample E, as shown in FIG. 25, was prepared as a comparative example. The recording fringing and the playback fringing were measured of the samples E and F in the same way as described above. The results are shown in Table 2.

TABLE 2

| | recording fringing | playback fringing |
|---|---|---|
| sample E | 0.5 μm | 0.7 dB |
| sample F | 2.5 μm | 0.5 dB |

It is seen from Table 2 that, according to the present invention, the recording fringing and the playback fringing can be reduced even with a magnetic head configured for concentrating the magnetic flux density towards the magnetic gap. Further, the playback outputs of the samples E and F were measured, using a digital camcorder, for measuring the sensitivities thereof.

It has become clear that the playback output of the sample E is higher approximately 1 dB than in the sample A. Thus it is seen that the sensitivity is improved if the magnetic metal film 6 is progressively reduced in film thickness towards the junction surface. Thus, the magnetic head is suitable for high-density recording.

What is claimed is:

1. A magnetic head in which a first magnetic core half and a second magnetic core half, each core half having a substrate with a surface obliquely angled relative to a sliding direction of the magnetic head and a magnetic metal film formed on said obliquely angled surface, are bonded together at a junction surface via a non-magnetic material for defining a magnetic gap, characterized in that:

a magnetic film core defined by the magnetic metal films formed on the obliquely angled surfaces of the respective first and second magnetic core halves is positioned obliquely relative to the sliding direction of the head relative to a recording medium;

the magnetic metal films formed on the obliquely angled surfaces of the respective first and second magnetic core halves are offset in a direction perpendicular to the sliding direction of the magnetic head relative to a recording medium such that the magnetic metal films formed on the obliquely angled surfaces of the respective first and second magnetic core halves are disjointed at the junction surface to the extent that a portion of each of the substrates which faces the junction surface faces a portion of the magnetic metal film formed on the obliquely angled surface of the substrate of the opposing first or second magnetic core half and which is exposed at the junction surface, each of the substrates having an exposed portion extending to the junction surface; and wherein said substrates of the respective first and second magnetic core halves are formed of a non-magnetic material.

2. The magnetic head as claimed in claim 1 wherein an underlying layer is provided between said substrate and said magnetic metal film of each of said respective first and second magnetic core halves.

3. The magnetic head as claimed in claim 2 wherein said underlying layer is colored differently from the substrate and the magnetic metal film.

4. The magnetic head as claimed in claim 1 wherein said magnetic metal film of each of said respective first and second magnetic core halves is made up of plural magnetic metal layers layered via non-magnetic layers.

5. The magnetic head as claimed in claim 4 wherein an uppermost one of the plural magnetic metal layers is thinner in film thickness than other magnetic metal layers.

6. The magnetic head as claimed in claim 1 wherein said magnetic metal film of each of said respective first and second magnetic core halves has a portion in the vicinity of the junction surface cut out so that the magnetic metal film is progressively reduced in thickness towards the junction surface.

7. The magnetic head as claimed in claim 1 wherein at least one of the magnetic metal films of the respective first and second magnetic core halves is formed on an abutting surface to the magnetic metal film of the other of the first and second magnetic core halves with a coil-forming recess in which is formed a coil formed by the thin film forming process.

* * * * *